United States Patent

Wike, Jr. et al.

[11] Patent Number: 5,164,584
[45] Date of Patent: Nov. 17, 1992

[54] OPTICAL SCANNER WITH POWER EFFICIENT LENS

[75] Inventors: Charles K. Wike, Jr.; Joseph M. Lindacher, both of Cambridge, Ohio

[73] Assignee: NCR Corporation, Dayton, Ohio

[21] Appl. No.: 720,080

[22] Filed: Jun. 24, 1991

[51] Int. Cl.⁵ .............................................. H01J 3/14
[52] U.S. Cl. ........................................ 250/216; 359/719
[58] Field of Search ............... 250/216, 560, 561, 562, 250/563, 571, 572, 566, 568, 555, 556, 208.1; 359/659, 719, 721

[56] References Cited

U.S. PATENT DOCUMENTS

| | | | |
|---|---|---|---|
| 2,811,081 | 10/1957 | Praeger | 359/721 |
| 3,419,321 | 12/1968 | Barber et al. | 350/8 |
| 4,203,652 | 5/1980 | Hanada | 359/721 |
| 4,426,696 | 1/1984 | Finck et al. | 359/641 |
| 4,530,574 | 7/1985 | Scifres et al. | 359/641 |
| 4,545,653 | 10/1985 | Brenden et al. | 359/719 |
| 4,592,627 | 6/1986 | Smid | 359/719 |
| 4,645,347 | 2/1987 | Rioux | 250/208.1 |
| 4,678,288 | 7/1987 | Lonsdale et al. | 350/432 |
| 4,770,506 | 9/1988 | Baba | 359/654 |
| 4,797,551 | 1/1989 | Ferrante | 250/234 |
| 4,971,410 | 11/1990 | Wike, Jr. et al. | 350/6.5 |
| 5,010,241 | 4/1991 | Butterworth | 250/568 |
| 5,075,561 | 12/1991 | Rioux | 250/561 |
| 5,080,456 | 1/1992 | Katz et al. | 359/721 |

Primary Examiner—David C. Nelms
Assistant Examiner—John R. Lee
Attorney, Agent, or Firm—Paul W. Martin

[57] ABSTRACT

An optical scanner which employs a special lens to maximize the percentage of focused laser light that passes through a collimating aperture. The optical scanner also includes a laser diode and a housing containing the laser diode and having a wall with the aperture therethrough for collimating light from the lens. The lens may be a gradient index (grin) lens, a bi-zonal lens, or an axicon lens. Another scanner is disclosed which employs an axicon lens to focus light reflected from an article having a bar code label to a detector for a range of article distances from the scanner.

12 Claims, 3 Drawing Sheets

OPTICAL SCANNER WITH POWER EFFICIENT LENS

BACKGROUND OF THE INVENTION

The present invention relates to optical scanners and more specifically to an optical scanner having a power efficient lens.

Optical scanners are well known for their usefulness in retail check out and inventory control. Optical scanners generally employ a laser diode, the light from which is focused and collimated to produce a scanning beam. An optical transceiver directs the beam against a plurality of stationary mirrors, and collects the beam after it is reflected by a bar code label. A motor rotates the optical transceiver, and a detector receives the returning beam. The pattern produced by such a scanner is characterized by lines oriented at various angles to one another. An example of an optical scanner can be found in commonly assigned U.S. Pat. No. 4,971,410, entitled, "Scanning and Collection System for a Compact Laser", issued Nov. 20, 1990, to Wike, Jr. et al. This patent is hereby incorporated by reference.

In addition to lenses that focus, some optical scanners employ lenses that collect light after it has reflected from the object scanned. For example, commonly assigned U.S. Pat. No. 4,797,551, entitled "Compact Laser Scanner Optical System", issued Jan. 10, 1989, to Ferrante discloses an optical scanner employing a bifocal lens which focuses reflected light beams at a photodetector and which has a lenslet portion which focuses a laser beam onto a bar code label. This patent is hereby incorporated by reference.

The laser diodes used in optical scanners exhibit an undesirable characteristic. Unfocused laser light produces a scanning ellipse, having two propagation axes for power, one axis diverging around thirty-five degrees and the other axis diverging around ten degrees.

Known focusing techniques for optical scanners, such as the scanner disclosed in Wike, Jr., employ a single spherical focusing lens followed by a circular aperture. The circular aperture determines the size of the laser beam projected at a reference plane by separating the central portion of the focused light from the outer portion of the focused light. However, this method necessarily entails a loss of as much as eighty-five percent of the light's power as the diameter of the circular aperture must be limited to maintain the optimum "F" number for a proper beam profile about the primary focus.

Focusing techniques for collected light, such as those disclosed in Ferrante, position a photodetector at a fixed distance from the collecting lens. Thus, a bar code label must be positioned at a particular distance from the scanner in order for the collecting lens to focus the reflected light at the photodetector. Variation of the bar code label from the optimum distance causes reflected light to focus away from the photodetector and thereby reduces the amount of light received by the photodetector. Also, the solid angle subtended by the collecting lens tends to vary with item position. It is desirable to maintain a constant solid angle and thus a constant collection light signal for varying item distances.

Therefore, it would be desirable to produce optical scanners having power efficient lenses: an optical scanner having a focusing lens, capable of refracting diverging light through a circular aperture, and an optical scanner having a collecting lens, capable of collecting and focusing light at a photodetector for various bar code label distances from the scanner.

SUMMARY OF THE INVENTION

In accordance with the teachings of the present invention, an optical scanner having a power efficient lens is provided. The optical scanner employs a special lens to maximize the percentage of focused laser light that passes through a collimating aperture. The optical scanner also includes a laser diode and a housing containing the laser diode having a wall with the aperture therethrough for collimating light from the lens. The lens may be a gradient index (grin) lens, a bi-zonal lens, or an axicon lens.

Another scanner is disclosed which employs an axicon lens to focus light reflected from an article having a bar code label to a detector for a range of article distances from the scanner.

It is accordingly an object of the present invention to provide a power efficient focusing lens.

It is another object of the present invention to provide a power efficient focusing lens which channels a greater portion of the light from a laser diode than previous lenses.

It is another object of the present invention to provide a power efficient focusing lens which channels a greater portion of the light from a laser diode than previous lenses and which produces a plurality of focal lengths.

It is another object of the present invention to provide a power efficient collecting lens for an optical scanner which is capable of maintaining a constant collection signal for varying item distances.

It is another object of the present invention to provide a power efficient collecting lens for an optical scanner which focuses and collects light at a photodetector for various bar code label distances.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
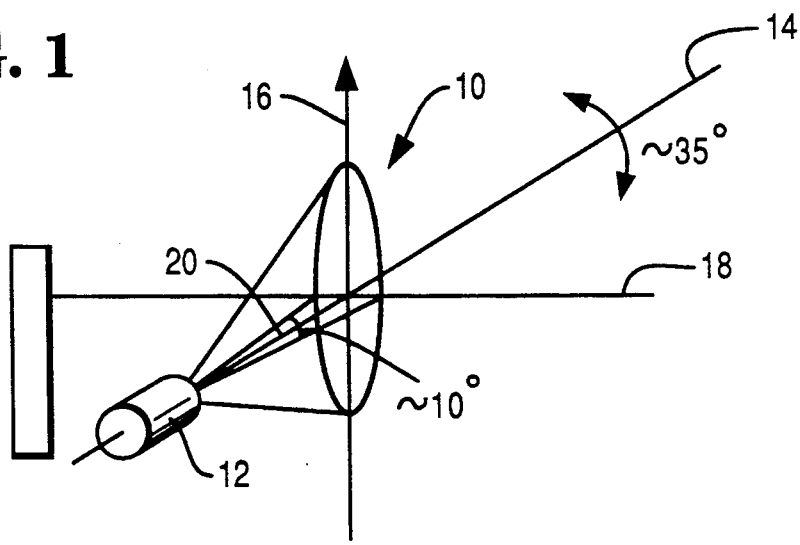
FIG. 1 is a scanning ellipse generated by a laser diode.

Turning now to FIG. 1, there is shown a scanning ellipse 10 from a laser diode 12. Laser diode 12 has propagation axes 14, 16, and 18. Axis 14 coincides with the center of beam 20. Axes 16 and 18 are useful in measuring the divergence of beam 20 from axis 14. Axis 16 measures vertical divergence along the major axis of scanning ellipse 10, while axis 18 measures horizontal divergence along the minor axis of scanning ellipse 10. Both vertical and horizontal divergence are symmetric about center axis 14, the vertical divergence approximating seventeen and a half degrees either side of center axis 14 for a total of thirty-five degrees and the horizontal divergence approximating five degrees either side of center axis 14 for a total of ten degrees.

Figure 2:
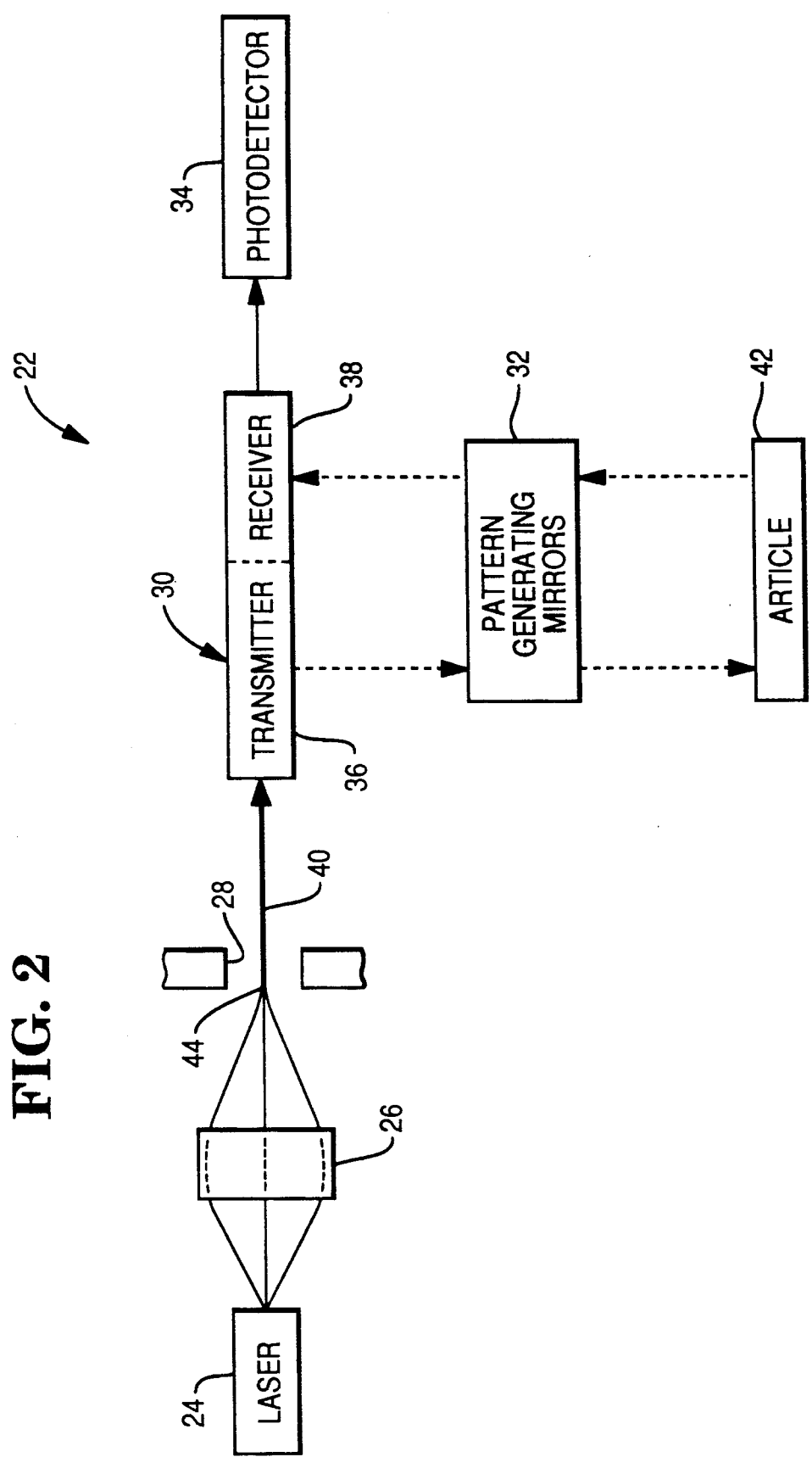
FIG. 2 is a schematic diagram of a first optical scanner of the present invention employing a gradient index (grin) lens.

Referring now to FIG. 2, optical scanner 22 of the present invention includes laser diode 24, focusing lens 26, collimating aperture 28, optical transceiver 30 rotatably mounted on a motor shaft, a plurality of stationary pattern generating mirrors 32, and detector 34. Focusing lens 26 is a commercially available gradient index (grin) lens, which is cylindrical in shape and characterized by a radially outwardly decreasing index of refraction. Aperture 28 is circular and is limited in diameter by the optimum "F" number for proper beam profile about the primary focal point. For an F number of 180, a grin lens preferably having a diameter of 3.0 millimeters and a length of 2.86 millimeters is used.

Optical transceiver 30 is mounted on a motor driven shaft and includes transmitting portion 36 and reflecting portion 38. Transmitting portion 36 is flat while receiver portion 38 is elliptical in shape. Pattern generating mirrors 32 are arranged around optical transceiver 30.

In operation, laser diode 24 outputs a diverging light beam which is focused by grin lens 26 and collimated by aperture 28. Grin lens 26 provides maximum power throughput. Light rays of all angles are focused at a single focal point 44 for collimation. Choosing the proper prescription can reduce loss of light to about zero. Thus, up to about one hundred percent of the laser light is used in forming beam 40. Collimated beam 40 is reflected by transmitter portion 36 against pattern generating mirrors 32. As the motor turns, light from transmitter portion 36 reflects from each of the pattern generating mirrors in repeating sequence on to article 42 having a bar code label to be scanned. Light reflected from article 42 reflects off of pattern generating mirrors 32 towards receiver portion 38 of transceiver 30. Receiver portion 38 directs the reflected light to photodetector 34.

Figure 3:
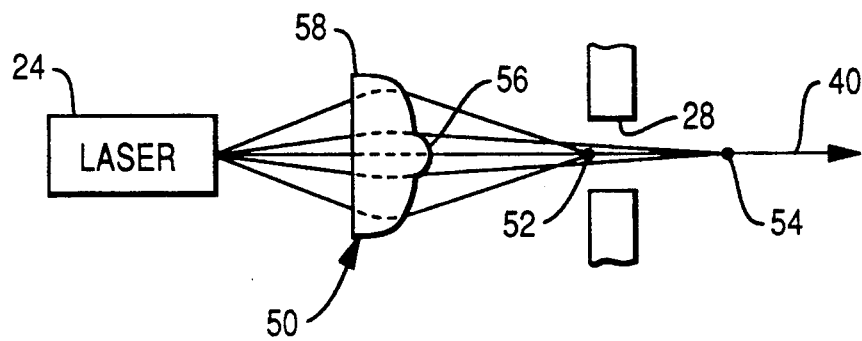
FIG. 3 is a schematic diagram of the focusing lens area of the optical scanner of a FIG. 2, but including a bi-zonal lens.

Turning now to FIG. 3, the lens area of optical scanner 22 of FIG. 2 is shown, but with bi-zonal lens 50. Bi-zonal focusing lens 50 focuses light at near and far focal points 52 and 54 for collimation. Center portion 56 is responsible for generating far focal point 54. Outer portion 58 is responsible for generating near focal point 52 and for refracting diverging light inwardly through aperture 28, thereby providing greater power throughput than a conventional spherical lens.

Choosing the proper prescription can reduce loss of light to about zero. Thus, up to about one hundred percent of the laser light can be used in forming beam 40. For an F number of 180, center portion 56 preferably has a diameter of 0.5 millimeter and a radius of curvature of 3.0. For the same F number, outer portion 58 has a diameter of 1.0 millimeters and a radius of curvature of 2.5 millimeters. The remaining components of scanner 22 in FIG. 2 remain substantially unchanged.

Figure 4:
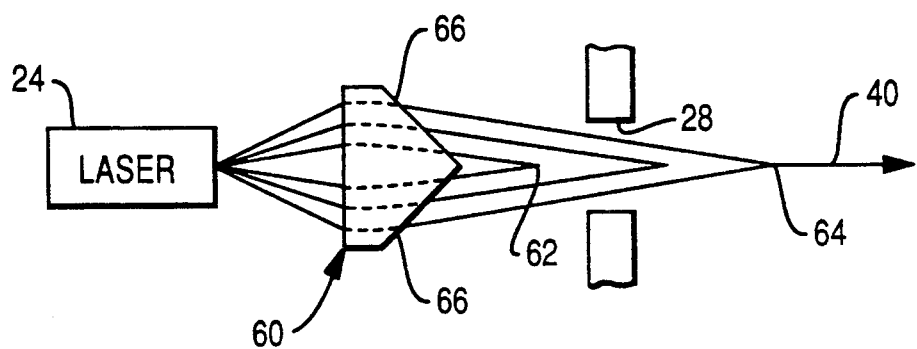
FIG. 4 is a schematic diagram of the focusing lens area of the optical scanner of a FIG. 2, but including an axicon lens.

Turning now to FIG. 4, the lens area of optical scanner 22 of FIG. 2 is shown, but with axicon focusing lens 60. Axicon focusing lens 60 is capable of producing an infinite number of focal lengths between minimum focal length 62 and maximum focal length 64, all at the same F number. Highly divergent light rays produce longer focal lengths than light rays closer to the center of lens 60. Power is distributed among each of the focal points.

Choosing the proper prescription can reduce loss of light to about zero. Thus, up to about one hundred percent of the laser light can be used in forming beam 40. For an F number of 180, the inclination of front surfaces 66 to beam 40 is preferably about 75 degrees and the index of refraction is about 1.5. Aside from axicon focusing lens 60, scanner 22 in FIG. 2 is substantially unchanged.

Figure 5:
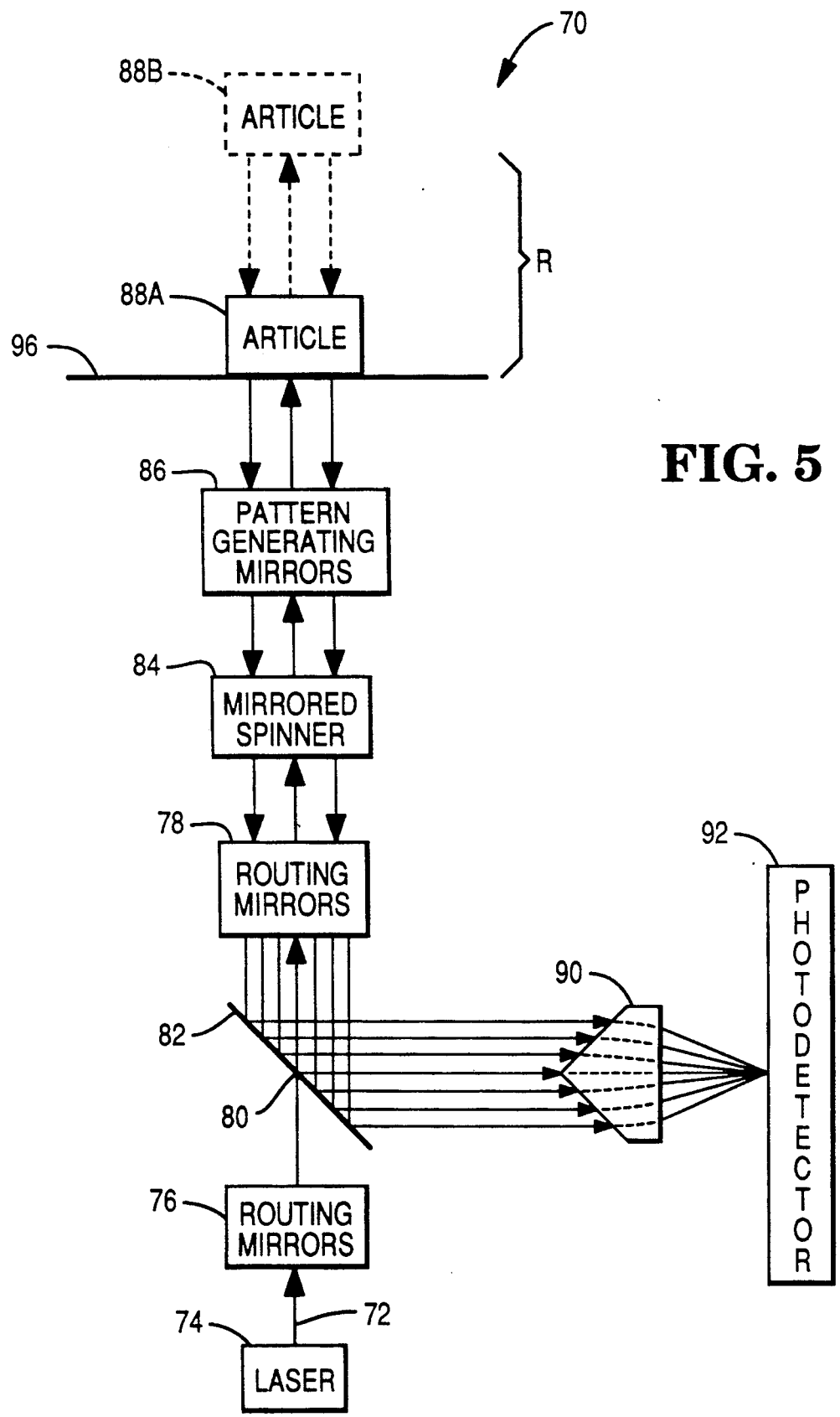
FIG. 5 is a schematic diagram of a second optical scanner containing an axicon collecting lens.

Referring now to FIG. 5, a second optical scanner 70 is shown. Laser light beam 72 is outputted from laser 74 and routed via routing mirrors 76 to routing mirrors 78 through aperture 80 in collection mirror 82. Routing mirrors 78 direct light beam 72 at rotating mirrored spinner 84. Upon striking mirrored spinner 84, the beam is directed to pattern generating mirrors 86. Pattern generating mirrors 86 direct a scanning pattern at articles 88A and 88B having bar code labels to be scanned.

After striking a bar code label, the diverging reflected light beams are retro-directed through pattern generating mirrors 86 to spinner 84 which directs the reflected light beams towards routing mirrors 78 from where the light beams are directed to collection mirror 82. Collection mirror 82 directs the light beams to lens 90, which focuses the received light beams at photodetector 92. Preferably, lens 90 is an axicon lens, which is capable of focusing light reflected from a bar code label located within a range R of distances from scanner 100. Photodetector 92 generates electrical signals for processing the data contained in bar code label.

The use of axicon lens 90 provides a range R of scanning reference planes from scanner 70 for locating bar code labels while maintaining a fixed collection point at photodetector 92. In the preferred embodiment, range R is about 12 inches, with the low point of range R, represented by article 88A, located about zero inches above scanning or checkout counter surface 96, and the high point of range R, represented by article 88B, located about twelve inches above scanning surface 96.

Choosing the proper prescription can reduce loss of reflected light from scanned articles within range R to about zero. Thus, up to about one hundred percent of the reflected light from scanned articles within range R can reach photodetector 92. In the preferred embodiment, axicon lens 90 has a diameter of 1.6 inches and an index of refraction of about 1.5. The inclination of the front surfaces to the incoming reflected light is preferably about 75 degrees.

Advantageously, more power reaches detector 92 through the use of an axicon lens than through the use of spherical lenses. Furthermore, the use of axicon lens 90 makes possible the construction of more compact conventional scanners, as multiple lens combinations are not required to produce the range R.

Although the invention has been described with particular reference to certain preferred embodiments thereof, variations and modifications of the present invention can be effected within the spirit and scope of the following claims.

What is claimed is:

1. An optical scanner comprising:
   a laser diode;
   a housing containing the laser diode and having a wall with an aperture therethrough for collimating light from the laser diode; and a gradient index lens between the laser diode and the wall for maximizing the percentage of focused light that passes through the collimating aperture.

2. The optical scanner as recited in claim 1, wherein the percentage of focused light is one hundred percent.

3. An optical scanner comprising:
a laser diode;
a housing containing the laser diode and having a wall with an aperture therethrough for collimating light from the laser diode; and
a bi-zonal lens between the laser diode and the wall for maximizing the percentage of focused light that passes through the collimating aperture.

4. The optical scanner as recited in claim 3, wherein the percentage of focused light is one hundred percent.

5. An optical scanner comprising:
a laser diode;
a housing containing the laser diode and having a wall with an aperture therethrough for collimating light from the laser diode; and
an axicon lens between the laser diode and the wall for maximizing the percentage of focused light that passes through the collimating aperture.

6. The optical scanner as recited in claim 5, wherein the percentage of focused light is one hundred percent.

7. An optical scanner comprising:
a housing;
a laser diode within the housing for producing a laser beam;
a stationary detector for receiving light reflected from an article having a bar code label to be scanned; and
an axicon lens for focusing the reflected light at the detector for a predetermined range of article distances from the scanner.

8. The optical scanner as recited in claim 7, wherein the range is 0 to 12 inches.

9. An optical scanner comprising:
a laser diode;
a housing containing the laser diode and having a wall with an aperture therethrough for collimating light from the laser diode;
a gradient index lens between the laser diode and the wall for maximizing the percentage of focused light that passes through the collimating aperture;
a plurality of pattern generating mirrors for directing the focused light at an article having a bar code label to be scanned, and for receiving the light after it has reflected from the article;
a photodetector for producing an electrical signal based upon the intensity of the reflected light; and
an optical transceiver for directing the focused light from the laser diode to the pattern generating mirrors, and for directing the reflected light from the pattern generating mirrors to the photodetector.

10. An optical scanner comprising:
a laser diode;
a housing containing the laser diode and having a wall with an aperture therethrough for collimating light from the laser diode;
a bi-zonal lens between the laser diode and the wall for maximizing the percentage of focused light that passes through the collimating aperture;
a plurality of pattern generating mirrors for directing the focused light at an article having a bar code label to be scanned, and for receiving the light after it has reflected from the article;
a photodetector for producing an electrical signal based upon the intensity of the reflected light; and
an optical transceiver for directing the focused light from the laser diode to the pattern generating mirrors, and for directing the reflected light from the pattern generating mirrors to the photodetector.

11. An optical scanner comprising:
a housing containing the laser diode and having a wall with an aperture therethrough for collimating light from the laser diode;
an axicon lens between the laser diode and the wall for maximizing the percentage of focused light that passes through the collimating aperture;
a plurality of pattern generating mirrors for directing the focused light at an article having a bar code label to be scanned, and for receiving the light after it has reflected from the article;
a photodetector for producing an electrical signal based upon the intensity of the reflected light; and
an optical transceiver for directing the focused light from the laser diode to the pattern generating mirrors, and for directing the reflected light from the pattern generating mirrors to the photodetector.

12. An optical scanner comprising:
a housing;
a laser diode within the housing for producing a laser beam;
a plurality of pattern generating mirrors for directing the laser beam at an article having a bar code label to be scanned, and for receiving the light after it has reflected from the article;
a stationary photodetector for producing an electrical signal based upon the intensity of the reflected light;
an optical collector for directing the reflected light from the pattern generating mirrors to the photodetector, and having an aperture for passing the laser beam from the laser diode to the pattern generating mirrors; and
an axicon lens between the collector and the photodetector for focusing the reflected light at the detector for a predetermined range of article distances from the scanner.

* * * * *